(No Model.)

P. C. JUST.
TROLLEY FOR CONDUIT RAILWAYS.

No. 497,377. Patented May 16, 1893.

Witnesses:
Chas. E. Turvey.
Gerald Mahony.

Inventor:
Paul C. Just,
by Wiles, Greene & Bitner
attys

UNITED STATES PATENT OFFICE.

PAUL C. JUST, OF CHICAGO, ILLINOIS.

TROLLEY FOR CONDUIT-RAILWAYS.

SPECIFICATION forming part of Letters Patent No. 497,377, dated May 16, 1893.

Application filed April 20, 1892. Serial No. 429,839. (No model.)

*To all whom it may concern:*

Be it known that I, PAUL C. JUST, a citizen of the United States of America, residing at Chicago, in the county of Cook and State of Illinois, have invented certain new and useful Improvements in Trolleys for Electric Railways, of which the following is a specification.

My invention relates to improvements in trolleys for electric railways, its object being to provide a trolley suitably supported by a moving car and adapted to be pressed upward against an electrical conductor and to readily change its position with reference to the vertical plane of its support, so that it may always lie in the plane of the conductor, even though that plane be not at every point exactly parallel to the track on which the car is moving. To this end I mount the contact roller of the trolley in an ordinary housing and swivel the housing to its support at a point either immediately beneath the roller or so near it, that the swiveling of the housing upon its pivot may enable the roller to constantly follow the plane of the conductor, thereby avoiding any tendency of the roller to bind upon the conductor or to break its contact with it.

The invention is fully described and explained in this specification and shown in the accompanying drawings, in which—

Figure 1:
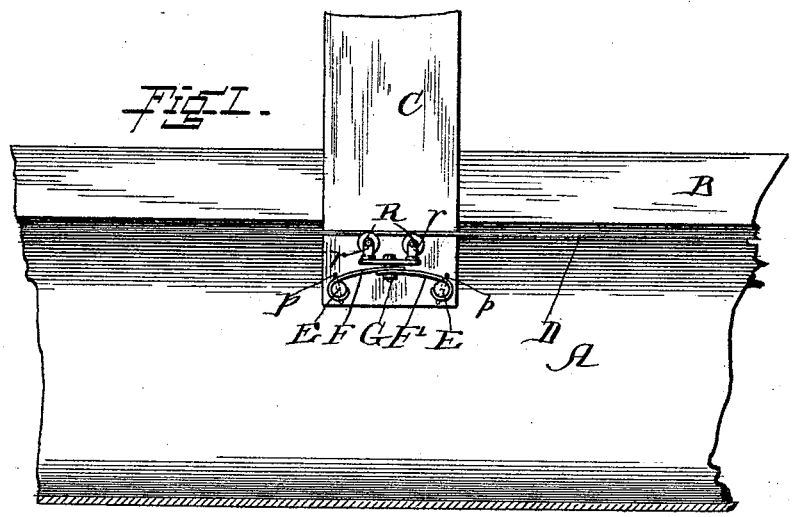
Figure 2:
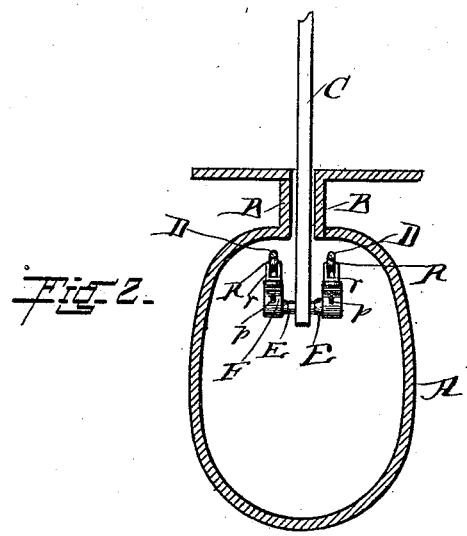
Figure 3:
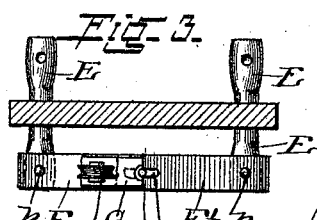

Figure 1 is a longitudinal vertical section of an underground conduit provided with electrical conductors and with a trolley embodying my improvements, the trolley and its support being shown in side elevation. Fig. 2 is a transverse vertical section of the conduit and conductors, the trolley and its support being shown in end elevation; and Fig. 3 is a horizontal section of the vertical arm which supports the trolley, the trolley being shown in top plan.

In the figures A is a tubular underground conduit of ordinary form and construction having the usual vertical slot protected by guide rails, B, B, which form its opposite faces. Electric conductors D, D, are secured within the conduit in lines parallel to each other, and an arm C, attached to a car above, extends downward through the slot and between the wires.

As the car and the motor, or motors, by which it is propelled form no part of this invention, they are not illustrated, but they may be of any construction adapted to be operated by an electric current through a suitable circuit.

On the lower end of the arm C, are secured a series of studs E, E, extending outward on either side of the arm, and springs F, F', are fastened to the two studs on either side of the arm and are of such length that their free ends overlap each other in the manner illustrated in Fig. 1, the end of the spring F, as shown, being above the end of the spring F'. A plate G, rests upon the spring F, and is held in place by a loose pin P, passing through a hole in the spring F, and through a slot S, in the spring F'. (See Fig. 3.) Two grooved rollers R, R, are mounted in suitable housings attached to the ends of the plate G, and all parts are so constructed and arranged that the upward pressure of the springs F, F', holds the rollers in contact with the conductor D, on the corresponding side of the arm C. The plate G, and pin P, swing freely in a horizontal plane, and the rollers R, R, are thereby enabled to keep their position in the vertical plane of the conductor; and the slot S, in the spring F', permits sufficient longitudinal movement of the springs F, F', upon each other to compensate for any upward or downward movement of the trolley as it follows the conductor. The two springs F, F', are so mounted upon the studs E, E, as to have a slight horizontal oscillation thereon, the studs being preferably tapered slightly both ways from their centers, and the outer ends of the springs being wrapped about the studs and secured by pins $p, p$, which are vertical or nearly so. This arrangement of the springs permits such bodily lateral movement of the trolley as may be necessary to enable it to follow the course of the conductor, though in underground work where the parts are near together, the amount of such lateral movement need never be very great.

I have found, in practice, that flat band springs, such as are shown, give the best results in the way of constant and uniform pressure and that two springs overlapping each other in the manner shown operate better under all conditions than a single spring supporting the contact roller. Nevertheless the single spring may be so arranged as to give very satisfactory results, and I desire not to limit my invention in this respect to the use of the two overlapping springs. The housings r, of the rollers R, R, may be either rigidly fastened to the plate, G, or their supporting spindles may be pivoted in the plate, thereby allowing each of the rollers to swivel independently. If the plate be of any great length, the independent swiveling of the housings is essential, but where it is very short, the swiveling of the plate gives sufficient flexibility to enable the rollers to follow the conductor without binding upon it.

Having now described and explained my invention, what I claim as new, and desire to secure by Letters Patent, is—

1. The combination with the dependent support C, of studs E, E, projecting laterally therefrom, springs F, F', mounted on said studs and overlapping each other, a plate supported by said springs and a swiveled roller supported by said plate; substantially as shown and described.

2. The combination with the dependent support C, of the studs E, E, projecting laterally therefrom, the springs F, F', mounted on said studs and having a limited horizontal oscillation, the plate G, supported by said springs, and the rollers R, R, supported by said plate; substantially as shown and described.

PAUL C. JUST.

Witnesses:
H. BITNER,
CHAS. O. SHERVEY.